US011867796B2

(12) United States Patent
Billaud et al.

(10) Patent No.: US 11,867,796 B2
(45) Date of Patent: Jan. 9, 2024

(54) SECONDARY RADAR IMPROVING AERIAL SAFETY VIA VERY-LONG-RANGE ADS-B DETECTION

(71) Applicant: THALES, Courbevoie (FR)

(72) Inventors: Philippe Billaud, Limours (FR); Jean-Marie Pannier, Limours (FR)

(73) Assignee: THALES, Courbevoie (FR)

( * ) Notice: Subject to any disclaimer, the term of this patent is extended or adjusted under 35 U.S.C. 154(b) by 288 days.

(21) Appl. No.: 17/364,026

(22) Filed: Jun. 30, 2021

(65) Prior Publication Data

US 2022/0035021 A1    Feb. 3, 2022

(30) Foreign Application Priority Data

Jul. 28, 2020    (FR) ..................... 2007963

(51) Int. Cl.
| | |
|---|---|
| *G01S 13/78* | (2006.01) |
| *G01S 13/933* | (2020.01) |
| *G01S 7/40* | (2006.01) |
| *G01S 13/76* | (2006.01) |
| *G08G 5/00* | (2006.01) |

(52) U.S. Cl.
CPC ............ *G01S 13/782* (2013.01); *G01S 7/403* (2021.05); *G01S 13/762* (2013.01); *G01S 13/933* (2020.01); *G08G 5/0008* (2013.01); *G08G 5/0078* (2013.01)

(58) Field of Classification Search
CPC .... G01S 13/762; G01S 13/765; G01S 13/782; G01S 13/933; G01S 17/933; G01S 7/403; G08G 5/0008; G08G 5/0078
See application file for complete search history.

(56) References Cited

U.S. PATENT DOCUMENTS

| | | | |
|---|---|---|---|
| 2019/0191910 A1* | 6/2019 | Davis ................... | A47B 61/003 |
| 2019/0355260 A1 | 11/2019 | Billaud | |
| 2020/0191910 A1* | 6/2020 | Billaud ................... | G01S 13/91 |

FOREIGN PATENT DOCUMENTS

| | | | |
|---|---|---|---|
| FR | 3 075 398 A1 | 6/2019 | |
| FR | 3 103 568 A1 | 5/2021 | |

OTHER PUBLICATIONS

Lo, et al., "Using Traffic Information Services Broadcast (TIS-B) signals for aviation navigation", 2016 IEEE/ION Position, Location and Navigation Symposium (PLANS), pp. 779-788, Apr. 11, 2016.

* cited by examiner

*Primary Examiner* — Timothy A Brainard
(74) *Attorney, Agent, or Firm* — BakerHostetler

(57) ABSTRACT

The secondary radar includes an antenna having a radiation pattern forming a sum channel, designated SUM, a radiation pattern forming a difference channel, designated DIFF, and a pattern forming a control channel, designated CONT, the targets are located by implementing the following steps: detecting ADS-B squitters received via the CONT channel, via the SUM channel and via the DIFF channel; measuring at least the power of the squitters and their azimuth with respect to the radar; the location of a target transmitting ADS-B squitters being computed by exploiting at least the detection of one ADS-B squitter, in light of the latitudinal and longitudinal position of the radar and of the azimuthal measurement with respect to the radar, the position cell, designated the CPR cell, coded in the squitter being selected via the azimuthal measurement.

8 Claims, 14 Drawing Sheets

SECONDARY RADAR IMPROVING AERIAL SAFETY VIA VERY-LONG-RANGE ADS-B DETECTION

CROSS-REFERENCE TO RELATED APPLICATIONS

This application claims priority to foreign French patent application No. FR 2007963, filed on Jul. 28, 2020, the disclosure of which is incorporated by reference in its entirety.

FIELD OF THE INVENTION

The present invention relates to the field of civilian and military air traffic control (ATC).

BACKGROUND

Currently, air traffic control is mainly based on secondary radar the detection reliability of which is widely recognised, secondary radar ensuring synchronous surveillance of aircraft via SSR and Mode S protocols. Moreover, non-synchronous reception of extended ADS-B squitters (ADS-B being the acronym of Automatic Dependent Surveillance-Broadcast) (squitters are aeroplane-delivered positional information; they are not triggered in response to radar interrogation signals, but are transmitted automatically from aeroplane transmitting means) intended, when implemented on-board aircraft, to prevent collisions (TCAS: Traffic Alert and Collision Avoidance System), is employed by on-the-ground ATC, thus delivering one part of the interactive surveillance system.

This surveillance may be coupled with a surveillance of IFF (Identification Friend or Foe) type, IFF interrogators ensuring the identification of aircraft according to various military protocols.

Within a single structure grouping these sensors together, the operational use of these various activities requires simultaneously:
  the secondary SSR/Mode S radar and the IFF interrogator, if the latter is used, to be listened for simultaneously, these synchronous-mode listening operations exploiting the formed beams SUM and DIFF;
  either civil ADS-B squitters or military Mode 5 squitters to be listened for in non-synchronous mode, these non-synchronous-mode listening operations exploiting the omnidirectional coverage of the control pattern (designated CONT) which is composed of the front control pattern (designated CONT_Front) and back control pattern (designated CONT_Back).

Conventionally, ADS-B squitters are transmitted, without solicitation from the secondary radar, at a rate specific to the transmitter, which rate especially depends on the state of the transmitter and on the nature of the transmitted information. As a result:
  an ADS-B receiver must be able to listen omnidirectionally; however:
    the antenna gain is often low, from 11 to 15 DBi for example, depending on the number of antennas employed to cover 360° in the case of a dedicated stand-alone ADS-B receiver;
    the specified guaranteed range is of the order of 150 Nmi, or even a little more depending on the quality of the transponder that transmits the squitter and on the number of antennas employed by the ADS-B receiver;
  in principle, in addition, two almost consecutive position squitters are required to locate a target in ADS-B mode.

The reception and processing of ADS-B information have been identified as functions that are essential to new generations of secondary radars. When the ADS-B function is integrated into the structure of a secondary radar, the reception function mainly exploits the CONT-Front and CONT-Back patterns, in order to achieve a listening coverage that is as close to 360° as possible. These patterns in general have a gain of the order of more than 17 dB, lower than the maximum gain of the sum pattern (designated SUM). However, the latter, which is used for synchronous detection in civil or military applications, with a gain of the order of 27 dBi, allows a detection range of the order of 250 Nmi to be guaranteed just.

In contrast to the synchronous mode, in civil or military applications, the radar range is conventionally limited primarily by the range of the uplink at 1030 MHz (i.e. by the power of the transmitted interrogations and the reception-end sensitivity of the transponders) and the ADS-B range is limited solely by the downlink at 1090 MHz, i.e. the power of the transponder and the sensitivity of the ADS-B receiver. Indeed, intrinsically to the structure of the secondary radar, the downlink (reception) is more sensitive than the uplink (transmission) in order to ensure that any reply generated by the transponder is receivable and exploitable.

As a result, the difference between the operational gain of a synchronous radar and one listening for non-synchronous ADS-B transmissions is, all else moreover being equal as regards the architecture of the two sensors, of the order of 8 to 10 dB. This leads, in an ADS-B receiver structure integrated into a secondary radar, to a guaranteed ADS-B range that is typically of the order of 100 Nmi, though it will additionally be borne in mind that a non-synchronous reply received via the control pattern (CONT) has a much higher chance of being garbled than a synchronous reply received via the SUM pattern because it is much narrower by nature (of the order of 3°). Furthermore, overlap of replies, which are then said to be garbled, i.e. replies that are coincident with one another, makes the detection and the decoding thereof more difficult. The guaranteed ADS-B detection rate in an environment crowded with aircraft, reception-end, is therefore two to three times lower than that of the Mode S secondary radar.

Prior-art solutions that attempt to overcome these performance deficiencies are known. In particular, in a dedicated ADS-B receiver the prior art consists in increasing the number of independent antennas in order to cover 360°, with a view to providing protection via azimuthal selectivity and simultaneously achieving an improvement by associating one beam with each receiver. The receivers are coupled to a common processing stage grouping the detecting operations together, this avoiding duplicate detections, and especially passage of a target from one receiver to the next (this allowing single ADS-B tracks to be constructed).

One drawback with this type of solution is especially the cost of the infrastructure of the ADS-B system, which increases with the number of antennas, which is typically 4 to 8 (multiple antennas, multiple down-leads, multi-sided pylons, multiple receivers, global ADS-B processing, etc.).

In the case of an ADS-B receiver integrated into a radar architecture, the detection via the sum pattern (SUM) and difference pattern (DIFF), in addition to the detections via the CONT patterns, allows a higher gain and a better azimuthal selectivity to be achieved but only for a very small proportion of the time (of the order of 1.4%, corresponding to 5°/360°. Therefore, this only makes it possible to ensure, in addition to the ADS-B listening operation carried out via the gain of the CONT pattern, a better listening time coverage, over 360°, on the axis of the antenna. Specifically, it is known that global detection by an ADS-B receiver requires two consecutive position squitters to generate a track. Thus, even if a first reply is received via the SUM pattern, the second will inevitably be received via the CONT pattern, and therefore, in the end, limited to the range of the CONT pattern alone, as regards an ADS-B reception chain [XXX: OK? ('chain' not in source)] integrated into a secondary-radar architecture.

SUMMARY OF THE INVENTION

One aim of the invention is especially to mitigate the drawbacks of the prior art, especially by allowing very-long-range ADS-B detection of targets to be obtained. To this end, one subject of the invention is a method for locating, with a secondary radar comprising an antenna having a radiation pattern forming a sum channel, designated SUM, a radiation pattern forming a difference channel, designated DIFF, and a pattern forming a control channel, designated CONT, targets transmitting ADS-B squitters, said targets being located by implementing the following steps:
  detecting ADS-B squitters received via said CONT channel, via said SUM channel and via said DIFF channel;
  measuring at least the power of said squitters and their azimuth with respect to said radar;
the location of a target transmitting ADS-B squitters being computed by exploiting at least the detection of a single ADS-B squitter, in light of the latitudinal and longitudinal position of said radar and of the azimuthal measurement with respect to said radar, the position cell, designated the CPR cell, coded in said squitter being selected via said azimuthal measurement.

In the case where two coded CPR positions coded in said squitter are possibly positioned in the same azimuthal sector, said two positions are for example discriminated between using the measured power and the altitude that is coded in said ADS-B squitter, the retained position being the position of highest likelihood according to an estimator based on the visibility of said target and to the consistency of the power received by the radar with the distance from the target to the radar.

In one particular mode of implementation, said method comprises a step in which the roll-call acquisition of a target is ensured as soon as it enters into the interrogation coverage of said radar by exploiting:
  the position coded in the ADS-B squitters transmitted by said target, as soon as it enters into the reception coverage of said radar;
  the roll-call identity of said target, which is contained in its Mode S address, which is coded in said squitters,
a single roll-call interrogation being transmitted every N rotations in order to lock the target to the code of the radar station and thus to avoid pollution by the M DF11 replies that a target usually generates on each rotation, potentially as soon as it enters into said interrogation coverage and up to a region of operational range of said radar.

Said method for example comprises a step in which, said targets being detected and located via their ADS-B squitters before the interrogation coverage of said radar, said targets are associated with ADS-B tracks as soon as they enter into said interrogation coverage, allowing them to be acquired by said secondary radar, then when said tracks are momentarily unlocked on their entry into said operational radar coverage in order to allow a potentially locked state thereof, i.e. whether they are locked to another radar, i.e. the absence of synchronous DF11 replies, to be detected and thus potentially to make it possible to provide warning of a conflict in II/SI code to other Mode S targets without ADS-B capability while ensuring Mode S roll-call surveillance of a target as soon as it enters into the operational coverage of said radar.

Said method for example comprises a step in which, in one moving time window, per 3D geographic cell, an average of the difference between the distance of a target measured by said radar and the distance of said target coded in the ADS-B squitters transmitted by said target is computed, this being done for every target passing through the cell, then each distance measured by the radar of any target in any mode is then corrected in light of the average differences computed for the geographic cell being flown over by said target.

Said method for example comprises a step of measuring the sensitivity of the transponders then detecting transponders of unsatisfactory sensitivity to the interrogations at 1030 MHz transmitted by said radar by interrogating, in roll-call mode or not, the targets transmitting ADS-B squitters located via said method, on entry into the interrogation coverage of said radar, and by computing the sensitivity of the transponder on the basis of the power received by the transponder on its first reply to said interrogations at 1030 MHz, a transponder being declared to be of unsatisfactory sensitivity if said power is higher than a given threshold.

Said method for example comprises a step in which an unsatisfactory altimeter associated with the transponder of an ADS-B target is detected by exploiting, in a series of geographic cells flown over by said target, the deviation of the difference between the barometric and geometric altitude coded in the ADS-B squitters transmitted by said target from the average, in a moving time window, of the difference between the barometric altitude and geometric altitude computed for other targets per cell for each of said geographic cells flown over by said target, an altimeter being judged to be unsatisfactory if said deviation exceeds a given threshold.

Another subject of the invention is a radar able to implement such a method.

BRIEF DESCRIPTION OF THE DRAWINGS

Other features and advantages of the invention will become apparent from the following description, which is given with reference to the appended drawings, which show.

DETAILED DESCRIPTION

Figure 1:
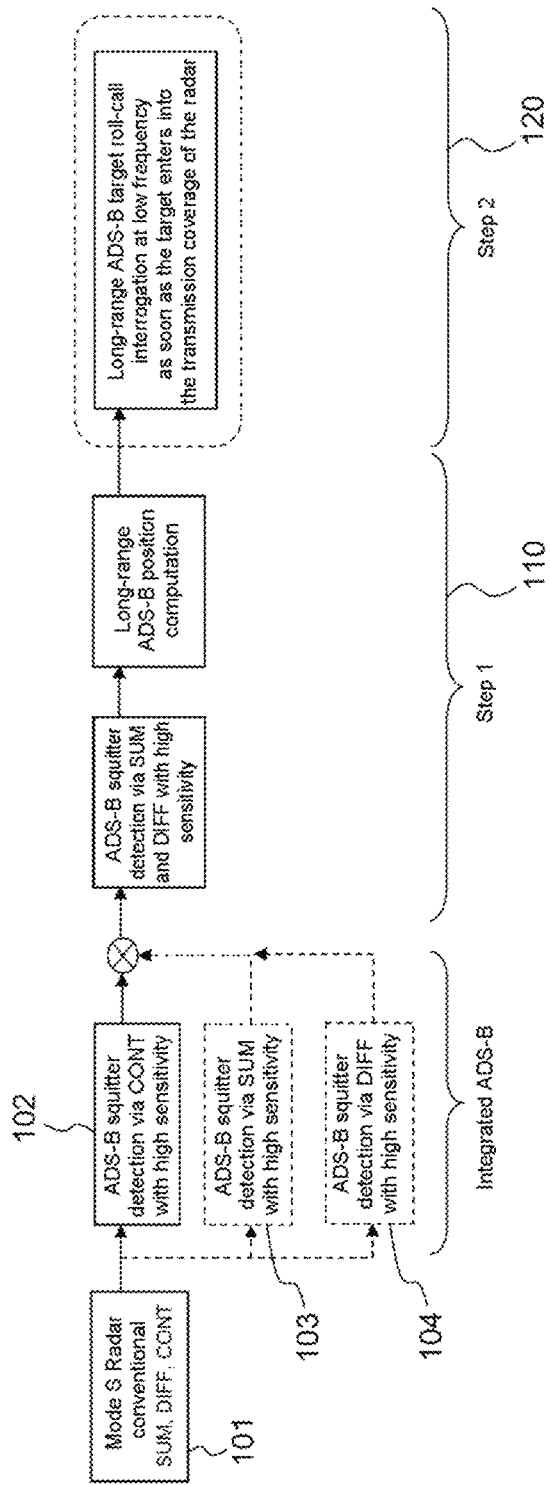
FIG. 1, possible steps for implementing the invention.

FIG. 1 illustrates the steps used for implementation of the invention. At least two steps are necessary for this implementation. For this implementation, the invention makes provision for the presence of an ADS-B detection function integrated into a secondary-radar structure 101 comprising:
- necessarily, continuous detection 102 via the CONT_Front and CONT_Back patterns with very high sensitivity;
- but also, optionally, continuous complementary detection via the patterns of the main lobe (detection 103 via the SUM pattern and detection 104 via the DIFF pattern) with lower sensitivity, of the order of 15 dB, with a view to linking the antenna gain of the CONT pattern (CONT_Front and CONT_Back) and thus plugging the gain gap, which occupies about 5°, in the CONT diagram on the axis of the antenna.

Figure 2:
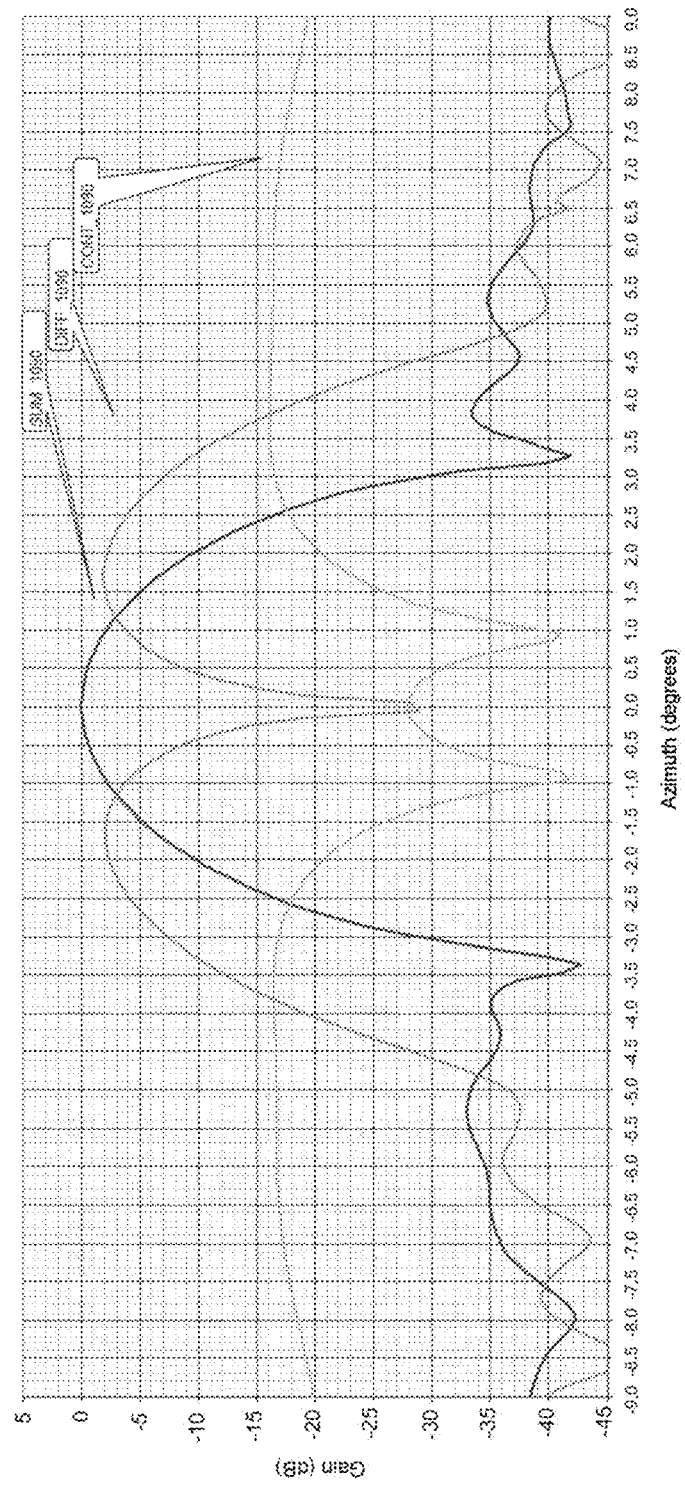
FIG. 2, an illustration of patterns of a conventional ATC antenna.
Figure 3:
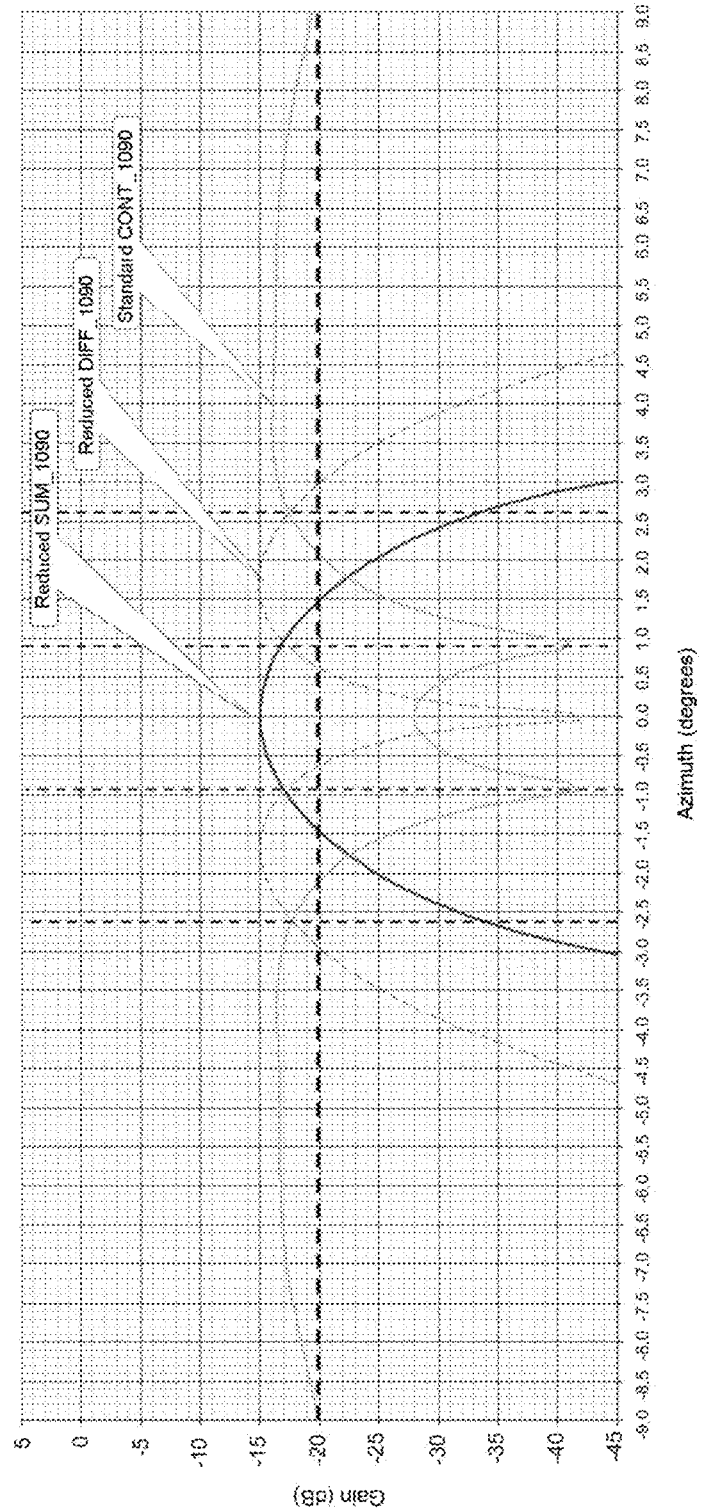
FIG. 3, an illustration of the azimuthal sensitivity in integrated ADS-B mode of a conventional ATC antenna.

FIGS. 2 and 3 illustrate the antenna patterns involved, reception-end at 1090 MHz. FIG. 2 shows the SUM, DIFF and CONT antenna patterns of an antenna conventionally used for the ATC function of a secondary radar. The gains of the SUM and DIFF patterns are much higher than the gain of the CONT pattern about the axis of the antenna. FIG. 3 shows the azimuthal, integrated ADS-B sensitivity of a conventional ATC antenna, the SUM and DIFF channels being aligned with the same reception-end sensitivity as the CONT channel.

Returning to FIG. 1, in the first step 110 very-long-range detection of ADS-B squitters is carried out, and thus:
- ADS-B squitters are detected via the SUM and DIFF patterns with very high sensitivity;
- the position of the target is computed with a single squitter, using conventional error-signal methods, on the basis of the detections via SUM and DIFF, as will be described in detail in the rest of the description.

The terms ADS-B squitters and ADS-B replies will be used interchangeably below.

In the second step 120, the first step 110 is exploited operationally. Passive detection, via ADS-B, of an aeroplane beyond the radar synchronous operational range, and even up to two times further, allows it to be exploited before this aeroplane even enters into the coverage of the radar, improving both the operation of the radar and the safety of the ATC surveillance system, as will be demonstrated below.

In the radar field, and more generally in the field of ATC aerial safety:
- RF pollution is reduced by locking out[XXX: OK? (verrouillage translated variously as 'locking' or 'locking out' throughout] at low-frequency targets as soon as they enter into the transmission coverage of the radar, and
- therefore well before the entry into the operational coverage of the radar, in order to limit pollution by replacing all the all-call (DF11) replies with a few roll-call (DF04) replies that are much lower in number;
- the detection of conflicts in II/SI code at the limit of the radar range is improved and detection of ADS-B targets in the radar coverage (i.e. more specifically ADS-B targets beyond the ADS-B listening range achievable via the CONT pattern) and that are wrongly locked by another radar is ensured;
- the precision of the synchronous distance measurement of the radar is improved by compensating for the distortion of ionospheric propagation.

In the field of ATC safety, the following are carried out before entry into the operational coverage of the radar for aeroplanes equipped with an ADS-B transmitter[XXX: OK? ('transmitter' not in source)]:
- non-polluting detection of an unsatisfactory sensitivity of the transponder;
- detection of an unsatisfactory altimeter associated with the transponder.

The principle of the invention, and the exploitation of the various regions of detection, will be described in more detail below. Initially, possible adaptations of a secondary radar architecture for implementing the invention will be described.

Figure 4:
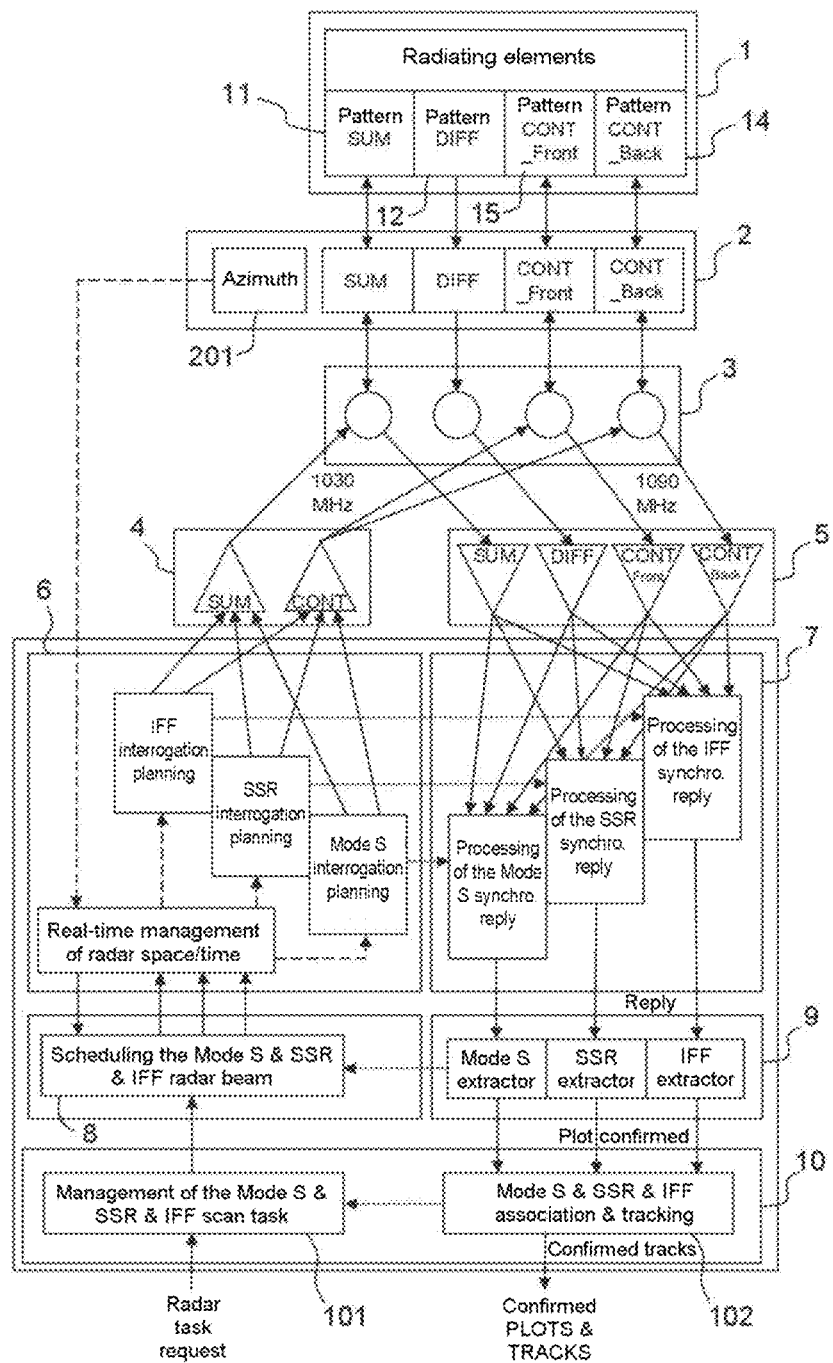
FIG. 4, an illustration of the architecture of a secondary radar according to the prior art, with no ADS-B reception.
Figure 5:
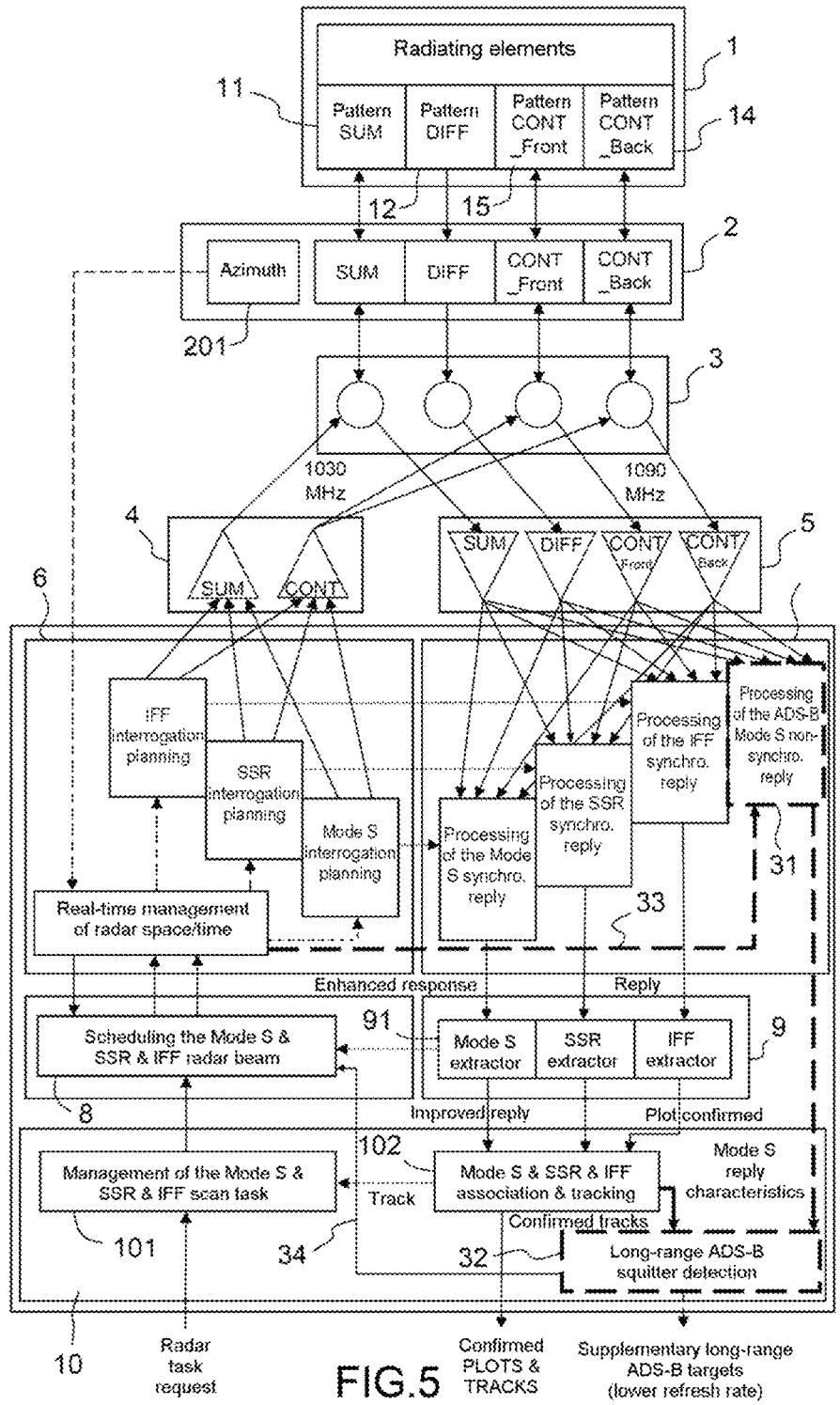
FIG. 5, an example of changes to the architecture of a secondary radar implementing the method according to the invention.

FIGS. 4 and 5 therefore illustrate changes to the architecture of a Mode S radar with respect to the invention, FIG. 4 illustrating a conventional prior-art structure and FIG. 5 illustrating a structure implementing the invention.

With reference to FIG. 4, which shows an example of a diagram of a conventional Mode S radar, the constituent elements of such a radar will be recalled. FIG. 4 shows the minimal architecture of a Mode S secondary radar without integrated ADS-B reception via the CONT_Front and CONT_Back patterns, which is not a standard reception mode[OK for équipement de base?] in the conventional secondary-radar configuration. The following description presents a solution based on four channels, SUM, DIFF, CONT_Front and CONT_Back, though the invention of course applies to a solution based on three channels SUM, DIFF and CONT.

When used in the way it conventionally is, the secondary radar operates in a synchronous mode, i.e. it transmits an interrogation and waits for a reply that is consistent therewith, this allowing it to locate via measurement (of azimuth and distance) and to identify (via the Mode S address) the target. The diagram of FIG. 4 illustrates this synchronous operation of the Mode S radar:
- the left-hand part shows the generation of the interrogations;
- the right-hand part shows the synchronous processing of the associated replies;

and the synchronisations therebetween, which are illustrated by the transverse arrows between left and right.

To perform this task, the radar is equipped with an antenna 1 that transmits the interrogations at 1030 MHz and receives in response replies at 1090 MHz, via four patterns 11, 12, 14, 15 the roles of which are conventionally:
- the SUM pattern, to interrogate and detect the synchronous reply of the target;
- the DIFF pattern, to finely locate the target in the SUM beam;
- the CONT_Front pattern, to block and reject replies from targets facing the antenna but not present in the main SUM beam;
- the CONT_Back pattern, to block and reject replies from targets behind the antenna (and therefore necessarily not present in the main SUM beam).

Whereas the SUM and DIFF patterns are conventionally narrow with 3 dB lobes between 2.4° to 10°, the CONT_Front and CONT_Back patterns seek to each practically cover 180°.

The antenna may also be:
- of set pattern, i.e. what is referred to as a "mechanical" antenna, and rotate;
- of active, electronically scanned pattern, i.e. what is referred to as AESA, and remain stationary or rotate.

A rotary joint 2 and antenna down cables, for a rotating antenna, ensure:
- RF coupling of the signals transmitted at 1030 MHz and received at 1090 MHz, independently for the four patterns between the rotating part and the fixed part of the radar;
- transfer of the azimuthal position 201 of the axis of the main lobe of the antenna.

An RF processing stage comprises:
a duplexer or circulator 3 ensuring the RF coupling between the signals transmitted at 1030 MHz and received at 1090 MHz, independently for the four patterns;
a transmitter 4 that:
- transmits interrogations at 1030 MHz via the SUM pattern;
- transmits pulses to block transponders outside of the SUM lobe at 1030 MHz via the CONT_Front and CONT_Back patterns;
- the transmitter doing this for the various secondary protocols: IFF, SSR and Mode S, a receiver 5 that receives replies at 1090 MHz via the four patterns SUM, DIFF, CONT_Front and CONT_Back and computes the error signal for the various secondary protocols: IFF, SSR and Mode S.

A real-time processing stage comprises:
a spatio-temporal manager 6 that manages in real time the interrogating periods and associated listening periods, for the various secondary protocols: IFF, SSR and Mode S,
a signal processor 7 that:
- processes the replies in the listening periods associated with the interrogations, for the various secondary protocols: IFF, SSR and Mode S,
- detects and decodes synchronous replies in the main lobe of the antenna, by exploiting the four radiation patterns:
  - SUM: to detect replies received in the main lobe;
  - DIFF: to finely locate azimuthally the replies received in the main SUM lobe and potentially to degarble garbled replies;
  - CONT_Front and CONT_Back: to reject replies received via side SUM and DIFF lobes.

A stage of processing the main lobe of the antenna comprises:
a manager 8 of targets present in the lobe, which:
- prepares (interrogation-reply) transactions to be carried out in the next lobe, for the various secondary protocols: IFF, SSR and Mode S;
- manages the IFF, SSR, all-call Mode S and roll-call Mode S periods in the lobe;
- dynamically places selective Mode S interrogations and replies in the next roll-call period depending on the state of the transactions that have just been carried out and on any new aircraft entering into the lobe;
extractors 9 that generate plots for each of the various secondary protocols (IFF, SSR and Mode S) on the basis of the synchronous replies received in the lobe and depending on the protocol employed for the interrogations.

A multi-rotation processing stage 10 comprises:
a manager 101 of the Mode S tasks to be performed regarding targets in coverage, which predicts target positions (antenna intersection) and prepares tasks to be performed that are associated with these positions according to internal requests, external requests and the state of the transactions of preceding rotations;
association of plots and tracking 102 of targets in coverage, ensuring targets are tracked with a view to improving performance (especially by removing false plots and checking decoded data) and predicting the future position thereof mainly, but not only, in Mode S.

A user interface allows the radar to take into account various requests, and the plots and tracks of targets to be viewed.

FIG. 5 shows the changes with respect to the conventional architecture of FIG. 4, these changes being presented using bold dashed lines. Whereas the operation of the Mode S radar is synchronous, it may be seen that the processing operations 31, 32 added for the invention are not linked to the transmission and exploit, as regards the first step 110 of the invention, only the azimuthal position of the axis of the main lobe of the antenna. Most of the elements remain unchanged, thus meeting the criterion of non-intrusion of the invention into the functional operation of the Mode S radar.

The main elements added have the functions described below:
In the spatio-temporal manager 6:
- transmission 33 of the azimuthal position of the main lobe of the antenna to the operation 31 for processing non-synchronous ADS-B replies (see below);

In the signal processor 7:
- addition of a processing operation 31 that is continuous (i.e. independent of the periods of transmission of interrogations) and that detects and decodes non-synchronous ADS-B replies by separately but equally exploiting the four patterns SUM, DIFF, CONT_Front and CONT_Back with their fullest sensitivity:
  - in order to detect all the ADS-B squitters received: DF17;
  - to extract the Mode S address therefrom;
  - to enrich each decoded reply with its characteristics: time of detection; azimuth of the main lobe of the antenna at the time of detection; power received via SUM, DIFF, CONT_Front and CONT_Back; and angle-off-boresight of the ADS-B squitter in the main SUM and DIFF beam, which is computed using an error-signal method;

In the non-real-time processing stage (multi-rotation processing stage)
- addition of long-range location 32 of ADS-B targets;
- decision 34 to carry out selective interrogation on reaching the synchronous interrogation range.

Figure 6:
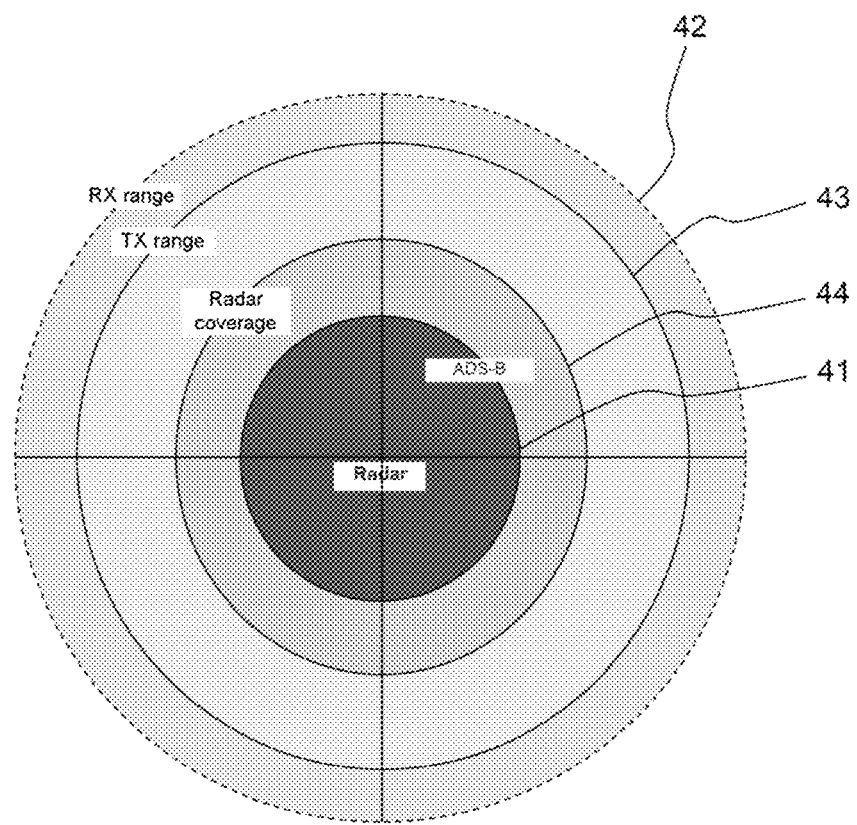
FIG. 6, the various interrogation- and detection-end ranges exploited by a radar according to the invention.

With reference to FIG. 6, the principle of the invention will now be explained. A radar according to the invention still exploits, in the conventional manner, the CONT patterns to detect ADS-B squitters. The range of the radar for this conventional ADS-B processing is illustrated by a first circle 41. In addition, as will be described below, the invention advantageously exploits the range limit of reception (RX), via the channels SUM and DIFF, of the signals transmitted by the transponders of surrounding aeroplanes, this range limit being illustrated by the circle 42 of larger diameter. The range of reception is itself greater than the maximum range of the interrogations transmitted (TX) by the radar and interpreted by the transponder, which range is illustrated by a third circle 43 corresponding to the transponder of high sensitivity.

In other words, the principle of long-range ADS-B detection according to the invention is based on the exploitation of the range differential between:

the operational coverage of the radar, which coverage is illustrated by a last circle 44 and based on the guaranteed values:
- a transponder of minimum sensitivity, with respect to transmission at 1030 MHz;
- a transponder of minimum power, with respect to synchronous reception at 1090 MHz;
- the gain of the SUM and DIFF patterns of the radar antenna in synchronous mode;
- the coverage of interest of use of the radar, which is necessarily narrower than the three preceding criteria cumulatively;

the maximum range 43 of the interrogations at 1030 MHz, considering a transponder having a maximum sensitivity, which maximum range is exploited in the second step 120;

the maximum range 42 of reception at 1090 MHz, considering a transponder transmitting with a maximum power;

the ADS-B operational range 41, for an ADS-B function integrated into the radar, based on the guaranteed values:
- the gain of the CONT pattern of the antenna used in conventional ADS-B mode to ensure the continuous detection of ADS-B squitters (see below);
- a transponder of minimum power, with respect to non-synchronous reception at 1090 MHz.

Figure 7:
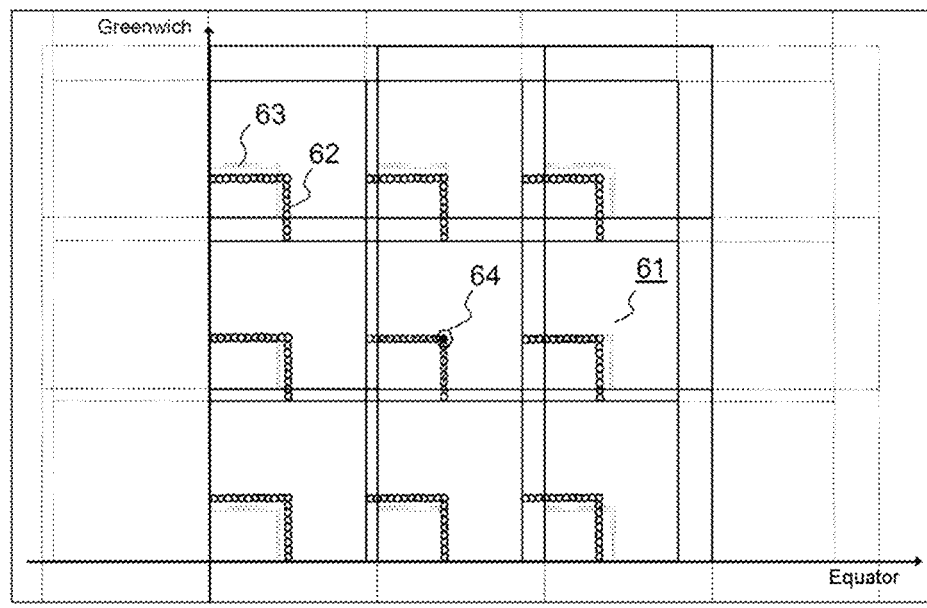
FIG. 7, an illustration of the global ADS-B detection principle with two successive squitters.

FIG. 7 illustrates the principle of ADS-B global detection with two squitters (replies below), which principle is applied in the prior art as recalled in the introduction. It is well known in the literature that the location information of ADS-B responders is coded into a format designated the CPR format (CPR being the acronym of Compact Position Reporting) in two ADS-B replies, one reply being transmitted in a first geographic reference frame called the even frame and the other reply being transmitted in a second geographic reference frame referred to as the odd frame. FIG. 7 shows, by way of example, nine reply cells 61, the even replies 62 being drawn in bold and the odd replies 63 being drawn with finer characters. Each CPR cell 62, 63 contains latitudinal information and longitudinal information relating to the cell, the cells being represented in a system of axes in which the y-axis represents latitude and the x-axis longitude. As known, an ADS-B receiver applying such global detection must, to locate an ADS-B transmission source:
- receive two successive ADS-B squitters of two different types: an even ADS-B squitter frame 62 and an odd ADS-B squitter frame 63;
- determine the position of the source (target) by computing the only CPR cell 64 in which the even and odd positions correspond.

It is thus able to reconstruct the absolute latitudinal and longitudinal position in the Earth's frame of reference (rather than relative to the cell).

Figure 8:
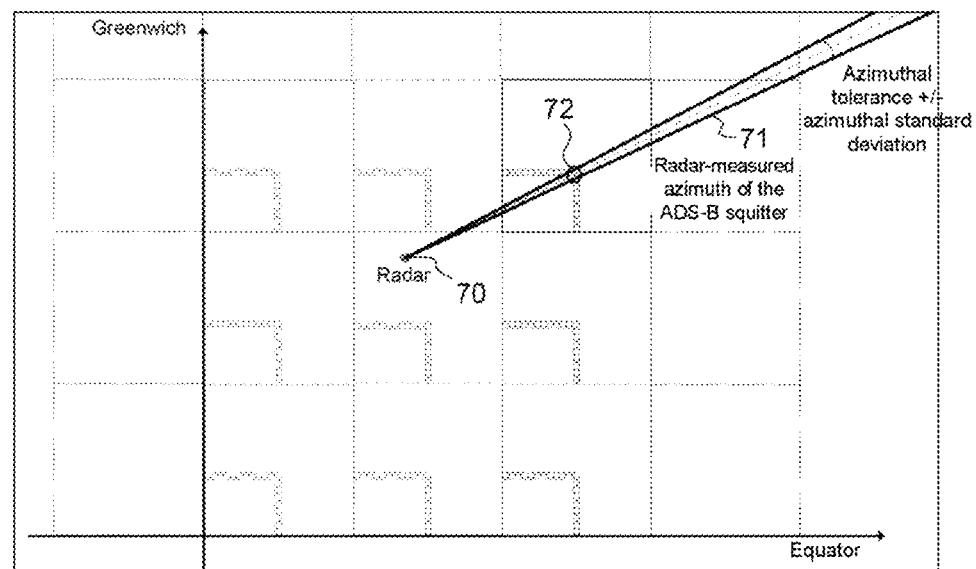
FIG. 8, an illustration of the ADS-B detection principle with a single squitter, according to the invention.

FIG. 8 illustrates the principle of ADS-B detection according to the invention. Here, the replies of a single frame are shown, the uneven frame for example. The principle of the invention consists in locating the position of a target on the basis of a single (even or odd) ADS-B reply by simultaneously exploiting:
- the latitudinal and longitudinal position of the radar 70;
- the azimuthal measurement 71 taken by the radar 70 on reception of this ADS-B squitter, which measurement is taken using the SUM and DIFF patterns.

Specifically, since the latitudinal and longitudinal position of the radar and the azimuthal measurement of the squitter are known (with a given tolerance), it is thus possible to compute the CPR cell 72 that meets the following two conditions:
- compact ADS-B position transmitted in the received squitter;
- azimuthal measurement of the squitter seen from the latitudinal and longitudinal position of the radar, and therefore to locate an ADS-B target with a single ADS-B squitter. With reference to FIG. 8, the azimuthal measurement 71 allows the position 72 (CPR cell) to be selected from the 9 possible positions (cells) shown in the figure.

To summarise the detection process according to the invention, it may be recalled that, on acquisition of the non-synchronous squitter via SUM or DIFF, the radar measures its characteristics identically to a synchronous reply, obtaining:
- the azimuthal position of the antenna;
- the angle-off-boresight of the target in the SUM beam using an error-signal method;
- the power of the squitter in SUM and DIFF.

Since distance has no meaning in the case of a non-synchronous reply, decoding the squitter delivers, for the target:
- the relative latitudinal position (even or odd CPR);
- the relative longitudinal position (even or odd CPR); the altitude.

Figure 9:
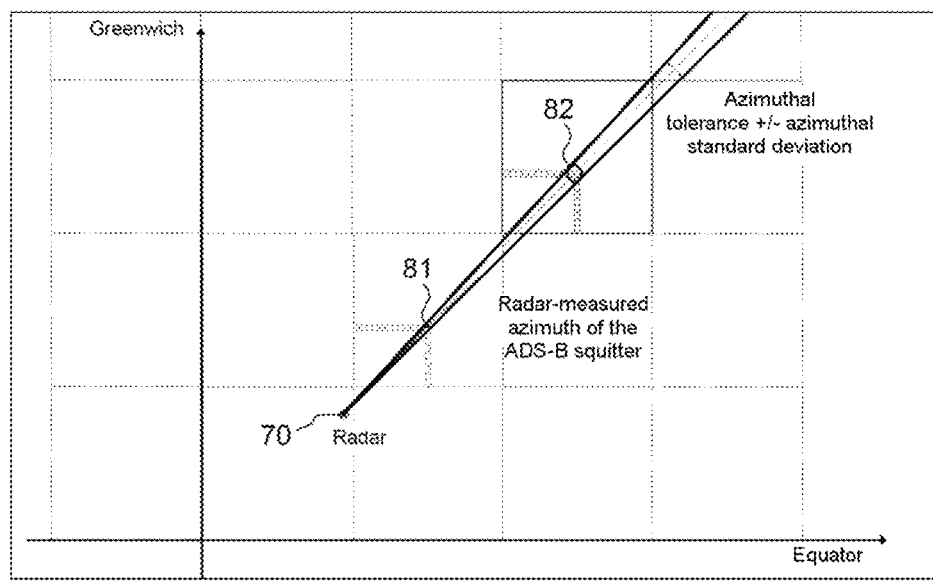
FIG. 9, an illustration of the achievable removal of ADS-B ambiguity.

In the long-range ADS-B location of the target, it is possible to encounter a geographic ambiguity when two possible positions 81, 82 of the target (in two contiguous CPR cells) are aligned with the position of the radar, as is illustrated in FIG. 9. In this case, the measured azimuth 71 alone is no longer a discriminant allowing the correct cell to be defined. Then, two other characteristics of the received ADS-B squitter are exploited:
- the power of the squitter in SUM and/or DIFF;
- the declared altitude of the target.

Since the characteristics of the radar are known: geographic position (including its altitude) and the RF losses of the installation, it is thus possible to define the position 82 of highest likelihood between the two possible positions, by establishing an estimator based on the visibility of the target by the radar (depending on the altitude of the radar and of the target) and the consistency of the received power of the squitter with the two positions.

This is done by simultaneously exploiting:
- the non-synchronous reception range of the radar via the SUM and DIFF patterns;
- detection and location of targets using a single squitter.

The radar advantageously detects ADS-B targets at very long ranges, conventionally more than two times the operational range 44 of the radar (see FIG. 6).

Figure 10:
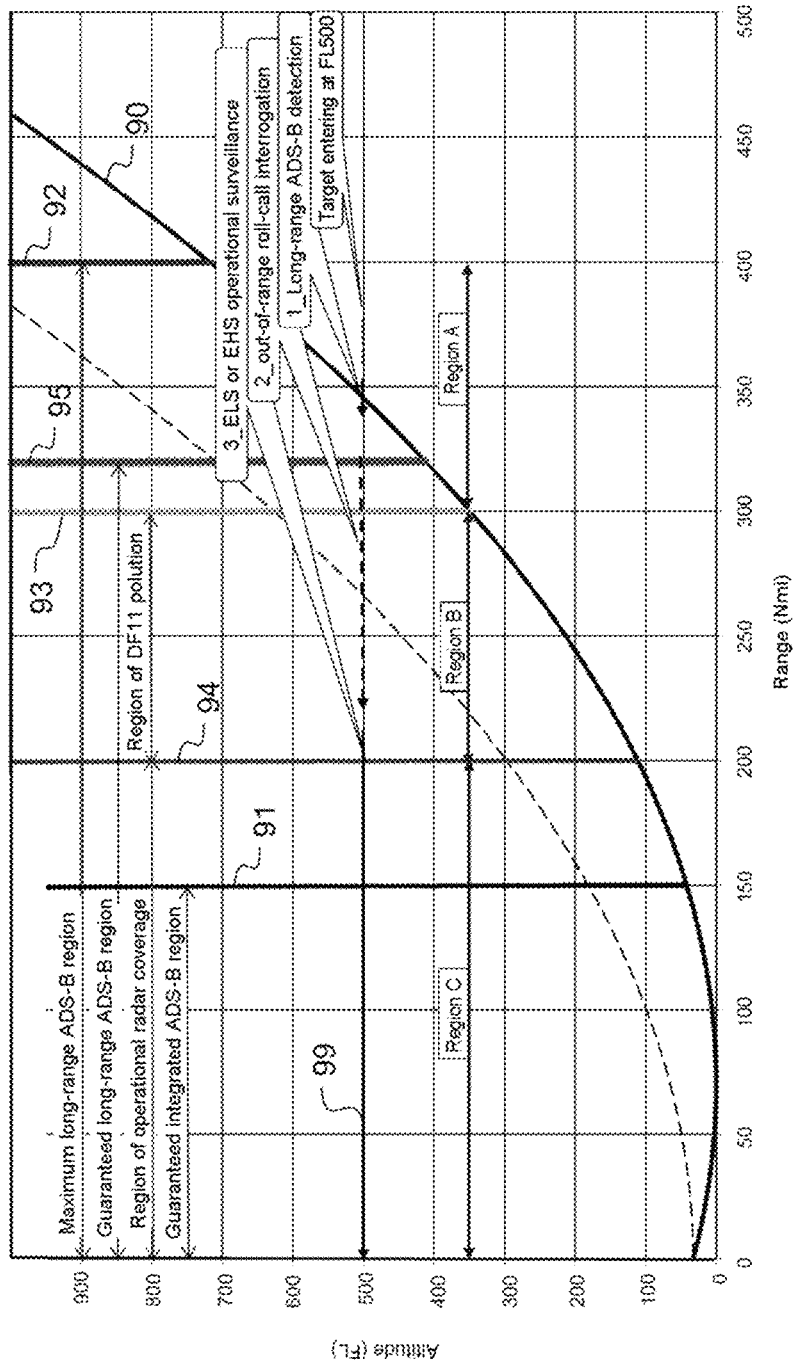
FIG. 10, an illustration of the various ranges involved in tracking a target entering into the radar coverage.

FIG. 10 illustrates the various regions of detection with respect to the path 99 of an aeroplane for example at FL500 (about 15000 m altitude) and with respect to the visibility of the aeroplane, which visibility is represented by a curve 90 dependent on the altitude both of the radar and of the target. FIG. 10 allows, in this example as a function of the distance of the target on the x-axis and of the altitude of the target on the y-axis, the following to be seen:
- the maximum long-range ADS-B detection region, which is bounded by an almost vertical line 92 dependent on the power of the transponder and on the sensitivity of the ADS-B receiver in the SUM pattern of the radar, the minimum guaranteed long-range ADS-B detection region, which is bounded by an almost vertical line 95;

the maximum region of pollution by all-call DF11 replies (transmission pollution range), which region is bounded by an almost vertical line 93 dependent on the sensitivity of the Mode S transponder to the interrogations of the radar via the SUM pattern;

the guaranteed operational range of the radar, which range is bounded by an almost vertical line 94;

the conventional detection region of an integrated ADS-B receiver via the CONT pattern, which region is bounded by an almost vertical line 91.

It will be noted that, typically, since the transponders that broadcast ADS-B squitters are by nature recent, their RF characteristics are usually good and therefore above the minimum of any given Mode S transponder, which usually constrains the operational range of the radar, which has to process all the Mode S targets even those not equipped with an ADS-B capability.

Looking to the left of the visibility limit 90 of the aeroplane, which depends on the altitude of the radar as a result of the curvature of the earth, the region between the most favourable long-range detection of ADS-B squitters according to the invention (line 92) and the guaranteed limit of detection of ADS-B squitters (line 95), in which region an aeroplane in radial flight may be detected before entering into the pollution region 93, then into the operational region of the radar 94 and lastly into the integrated ADS-B detection region 91 (guaranteed conventional ADS-B detection) may be seen.

If an aeroplane, for example at the altitude FL500, entering into the coverage of the radar is considered, the invention allows three regions to be considered:

a region A, in which ADS-B squitters are detected at long range before the possible start of DF11 pollution;

a region B, corresponding to the start of DF11 pollution before the radar coverage;

a region C, corresponding to the radar coverage including conventional integrated ADS-B reception.

As the above description shows, the present invention is based on the fact that the operations required to integrate the ADS-B function into a radar architecture are almost identical to the Mode S signal-processing operations implemented by the radar to process synchronous (DF11, DF04/05, DF20/21) replies since ADS-B squitters are in fact merely extended Mode S replies. The invention furthermore allows, in the main SUM or DIFF lobe of the radar beam:

the received squitters to be located with respect to azimuth and with respect to power by performing a conventional very precise radar measurement, here on a non-synchronous reply instead of a synchronous reply as is conventionally the case:

to obtain a high antenna gain, of the order of 15 dB higher than the gain of the CONT pattern, which is usually used for ADS-B detection, i.e. a range of the order of four times greater than the usual (conventional) integrated ADS-B range (for reasons of ease of illustration, the various separations have not been shown to scale);

to locate a target at very long range with a single squitter (and not two as conventionally required when it is not sought to detect at very long range), by exploiting knowledge of the position of the radar, the precise azimuthal measurement taken by this radar and the relative latitudinal and longitudinal CPR position coded in the detected ADS-B squitter.

Granted the temporal coverage remains low, lower than or equal to 1.4% depending on the width of the SUM pattern, but the invention allows the secondary radar to treat similarly far-off targets at very long range (between 200 Nmi and 500 Nmi as shown in FIG. 10) as is conventionally done with closer targets with a conventional integrated ADS-B receiver exploiting the omnidirectional CONT pattern.

The advantages made possible by the invention, which are exploited in the second step 120 (FIG. 1), will now be described, these relating especially to:

with respect to the radar:
    the decrease in pollution at 1090 MHz;
    the detection of conflicts in II/SI code and the detection of targets wrongly locked in the region of duplicated coverage between the 2 radars in conflict;
    correction of the distance measured by the radar (propagation dependent);

with respect to ATC safety:
    detection of transponders of unsatisfactory sensitivity at 1030 MHz; generation of a map of atmospheric pressure and detection of unsatisfactory altimeters.

These five operational improvements that are advantageously made possible by the invention are described below. Decrease of pollution at 1090 MHz and of the number of replies from targets outside of the operational coverage of the radar.

Currently, occupation of the 1090 MHz spectrum is becoming one of the weak points of ATC surveillance. The encountered pollution is due to its success and the replies exploited thereby are of different types, such as:

DF11: for acquiring new targets with a Mode S radar;
DF04/05: for Mode S ATC surveillance: ELementary Surveillance (ELS);
DF20/21: for Mode S ATC surveillance: EnHanced Surveillance (ENS);
DF0: for active TCAS collision avoidance;
DF17: ADS-B squitters for passive ACAS collision avoidance (ACAS being the acronym of Airborne Collision Avoidance System).

D04/05/17/20/21 replies will continue to exist given the purpose of the function that they perform in a Mode S radar when used operationally. DF0 replies will eventually be replaced by DF17 replies. DF11 replies are generated by targets that are not yet known to a radar and are only partially replaceable by another means such as:

a cluster of Mode S radars; but this reduces pollution only inside its coverage, DF11 pollution continues to exist outside of the common coverage of the cluster;

track initialisation based on ADS-B squitters; but the RF coverage of an omnidirectional ADS-B receiver is about two times less than that of the radar and therefore is exploitable only at short and medium radar range to initialise radar tracks based on ADS-B squitters; this therefore does not prevent long-range pollution and limits the range of the radar.

To describe the contribution of the invention to the reduction of pollution of the 1090 MHz spectrum, reference is made to FIG. 10: if a target flying at FL500 entering into the coverage of the radar is considered:

region A: almost as soon as the target is visible it may be detected via long-range ADS-B detection;

region B: if the radar is permitted at this azimuth, it may then lock the target via roll-call UF4 interrogations as soon as it enters into the transmission coverage of the radar, and therefore even before it starts to respond to DF11 all-call interrogations; subsequently the radar keeps making roll-call interrogations at a lower rate (about 15 to 18 sec), which is just enough to prevent the target from becoming unlocked: thus DF11 pollution (3 to each revolution of 5 sec) is reduced to a lower amount of DF04 pollution (1 every 3 rotations of 5 sec) and therefore in a ratio close to 10;

region C: the target enters into the operational coverage of the radar; the track is then advantageously already established.

The invention thus allows both pollution due to our radar to be reduced and the number of replies generated needlessly by this transponder to be reduced, while accelerating radar tracking when the target eventually enters into the operational coverage of the Mode S radar.

Detection of a region of conflict in II/SI code at long distance and detection of wrongly locked ADS-B targets.

Figure 11:
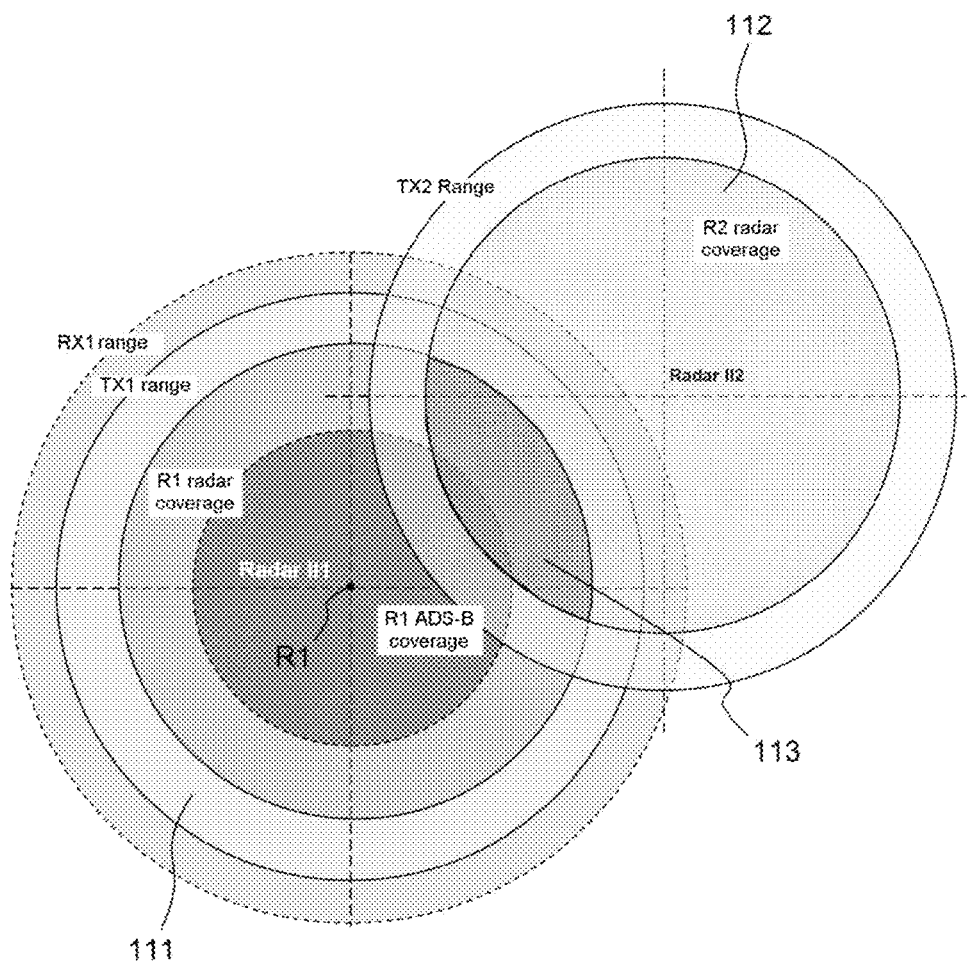
FIG. 11, an example of a region of conflict in II/SI code between radars the coverages of which overlap.

The principle of conflict in II/SI code at the limit of the range of the radar will be recalled below with reference to FIG. 11. A plurality of solutions (see especially patent application FR1913154) propose to detect a region of the radar coverage in which there is a conflict in II/SI code with another radar R2 close to the radar R1 in question, their operational coverages 111, 112 overlapping. The region of overlap 113 is the region of conflict in II/SI code (if II1=II2) between the two operational coverages and hence a region in which the two radars R1, R2 lock to the same II/SI code targets entering into their coverage, thus masking them from the other radar.

If, by way of example, the various existing approaches are considered, depending on the position of a radar R1 of very long range, typically 250 Nmi (that of R2 being reciprocal), in the common azimuth of R1 and R2 the difference between the maximum distance between the exiting targets (which are therefore far-off because already locked by R1) and the entering targets of R1 (which are therefore seen only when closer because already locked by R2) indicates a probability of conflict. This method is solely indicative (probability based on behaviour) and it does not allow it to be observed that an entering target has not been seen in the region of conflict and therefore even less so to mitigate this problem, and hence ATC safety cannot be ensured.

In this common azimuth of R1 and R2, as throughout the ADS-B coverage of the radar R1, Mode S radar tracking of a target that has not yet been detected (via UF11/DF11 all calls or by the Mode S cluster), using the Mode S address and the position given by the ADS-B squitter broadcast by the target, allows:

the conflict in II/SI code in the common region 114 of operational coverage of R2 and of ADS-B coverage of R1 to be addressed;

a high reactivity to be ensured and therefore ADS-B targets locked by R2 to be detected as soon as they reach the ADS-B coverage of R1, However, as the conventional range of an integrated ADS-B receiver of R1 is limited by the lower gain of the CONT channel compared to the SUM channel of R1 (about 15 dB), this does not cover the entire region of conflict of radars at long ranges.

For the same reasons, analysis of the presence and of the distribution of FRUITS, such as described in patent application FR1913154, is henceforth applicable to all Mode S aeroplanes whether they are equipped with an ADS-B OUT capability or not, but is, as for the ADS-B range of R1, limited by the lower gain of CONT vs SUM of R1, therefore this analysis applies to radars of medium range.

According to the invention, ADS-B targets are henceforth detected and located via their squitters and associated with ADS-B tracks well before the operational coverage of the radar, i.e. the region of reception of UF11 and DF11 all calls, which is also the region of UF04/05 and DF04/05 roll-call interrogations, i.e. at this distance far off from the radar, as shown in FIG. 10.

If the principle of removal of pollution described above is not applied (in case for example of refusal by the user to permit locking out to occur out of coverage, and therefore in region B), the radar R1 may still nevertheless interrogate this target as soon as it enters into its region of operational coverage (region C) and thus ensure a perfect Mode S surveillance in the complete region of conflict in II/SI code, provided however that the target is equipped with an ADS-B capability.

The conflict in II/SI code is declared only in the operational coverage of the radar 94 subsequently: if the ADS-B target was locked out in region B in order to reduce pollution by DF11 replies, then the invention proposes to undo the lockout on entry into region C, if permission to do so is granted, in order to verify the absence of DF11 replies from this target in region C, with a view to declaring the conflict in II/SI code if the radar receives DF04/05 replies to roll-call interrogations of this same target; therefore, with this method, the target is first detected and only then is it verified whether there is a conflict in II/SI code or not, especially in order to provide warning of the potential non-detection of aeroplanes equipped with a Mode S but not ADS-B capability.

If the ADS-B target was not locked in region C, then the absence of DF11 reply therefrom to the radar before its entry into region B, and therefore before it is locked in the operational coverage of the radar, becomes an indicator of a conflict in II/SI code.

Correction of the distance measured by the radar (propagation dependent).

It is known that the waves of a secondary radar at 1030 MHz and 1090 MHz do not propagate in a straight line, as a result of index distortions in the layers of the ionosphere; as a result, targets appear thereto to be further than they in fact are.

According to the invention, to correct the distance measured by the radar, it is possible to use the same ADS-B squitters as those used for the long-range ADS-B detection:

the ADS-B "airborne position" messages transmitted about every 0.5 seconds deliver both latitudinal/longitudinal position and barometric altitude.

Since step 110 allowed the latitudinal and longitudinal position and the altitude of the ADS-B target to be determined with a single squitter, in association with the known latitudinal and longitudinal position of the radar, it is possible to recalculate the exact distance from the target, i.e. from the geographic site and altitude at which said target is located, to the radar, this mainly being useful for high-altitude radars (altitude higher than 1000 m) having a visibility of medium-altitude targets at very long distances from the radar.

The invention therefore proposes, in a moving time base that may be adjustable to reflect the atmospheric stability of the environment, to gather, per 3D geographic cell and per altitude slice, statistics on the difference between the distance measured by the radar and the distance computed by the ADS-B targets present in the cell. Thus, with each cell, using ADS-B targets, is associated an average difference between distance measured by the radar and geometric distance. This analysis may be carried out in the region C, or even in the region B if the radar is permitted to interrogate targets outside of its operational coverage.

If the statistics per cell are representative (i.e. based on a sufficient number of samples exhibiting a stable distance difference and a consistency with neighbouring cells) then, with each synchronous SSR, Mode S or IFF target detection by the radar, whether said target is ADS-B capable or not, the measured distance (which therefore includes effects due to propagation through ionospheric layers) may be completed by an evaluation of geometric distance, so as to correct the measured distance with the average difference of this cell at this altitude, and therefore for the contribution of ionospheric reflections. The distance measured by the radar is thus corrected depending on average differences computed in the geographic cells flown over successively by the target. With respect to multi-radar management, this correction of distance furthermore allows the association of the tracks generated by various radars for the same target to be improved, thus compensating for the unequal layer propagation seen thereby.

Detection of Transponders of Low Sensitivity

One aim of this optional step of the invention is to detect, as soon as possible after entry into the far-off coverage of the radar, the presence of aeroplanes comprising a transponder of low sensitivity, i.e. of sensitivity below standard thresholds. It is thus possible to provide warning as to the potential fragility of synchronous detection of these aeroplanes by the radar, i.e. of aeroplanes that, during manoeuvres that then decrease the radiated field received from the radar, may then no longer be detected. The ICAO defines, in Annex 10 Volume IV, the RF characteristics expected from the antenna of a transponder installed in an aeroplane:

as regards sensitivity: −71 to −77 dBm, with respect to the ability to listen
for interrogations (synchronous mode only);
as regards power: 51 to 57 dBm (125 to 500 W), with respect to the
transmission of synchronous and non-synchronous replies.

Patent application FR1800479 proposes to evaluate the sensitivity of a transponder in an active configuration, typically during take-off of the aeroplane from an airport, and hence a priori at short distance, by transmitting various interrogations, which are supplementary to the surveillance of the target. The power of these interrogations is attenuated (both via reduction in the transmitter of the radar but also using attenuation of the antenna gain when the target is very off-boresight in the lobe) in order to determine at which power the target no longer responds. Specifically, as the power of the replies of the transponder remains maximal even at short distance from the interrogator, it is known that non-detection of the reply by the radar can only be due to non-interpretation of the interrogation by the transponder.

The invention here has the same aim, and proposes to evaluate the sensitivity of transponders in a quasi-passive configuration, i.e. without generating any additional interrogations and therefore without additional pollution, which would run contrary to the preceding approach, with the same aim of providing warning of the presence of transponders that are not sensitive enough.

To this end, as soon as the ADS-B squitter is received in the main antenna lobe (SUM and/or DIFF), the target is identified via its Mode S address and located with respect to azimuth and distance. In order to limit the pollution generated by the DF11 replies that the target transmits as soon as it has interpreted the interrogations, the target is selectively locked out as soon as possible via roll-call interrogations conducted using the full power of the transmitter of the radar in its centre lobe (and therefore the one of maximum gain), at a very low repetition rate (typically 1 time every 15 seconds).

As the radar located the target via the ADS-B squitters of this target, it may be taken for granted that the power transmitted by the transponder will also be in spec when the target starts to respond to a UF11 all-call or UF04/05 roll-call interrogation; the latter is therefore just above the reception-end sensitivity threshold of the transponder; the radar is then able to compute the power received by the antenna of the transponder by exploiting characteristics, as is described in the aforementioned patent application FR1800479, these characteristics being:

as regards the radar:
antenna gain (maximum gain—loss of antenna gain due to the azimuthal off-boresight angle of the target during the interrogation);
losses due to the cables between transmitter and antenna;
peak power of its transmitter; and
as regards the target:
loss of antenna gain as a function of the elevation of the target seen from the antenna of the radar;
propagation losses estimated assuming that propagation effects remain similar between the interrogations and the replies since the frequencies are very close (1030 MHz for the interrogations and 1090 MHz for the replies) while taking into account other known characteristics related to the two frequencies.

In both cases, in common, as soon as targets appear in the airspace, and although there are differences between the two approaches, which are indicated below, they complement each other and both work toward the same goal.

As regards patent application FR1800479, it is sought to take a measurement of sensitivity, typically during take-off of an aeroplane from an airport, and therefore at small distance, by decreasing the power transmitted in the successive interrogations until the reception-end sensitivity threshold is crossed, causing the transponder to not respond: the search is therefore active and polluting but remains acceptable because it is performed only on initialisation of the path.

According to the present invention, it is sought to take a measurement of sensitivity at a long-distance, typically before an aeroplane even enters into the airspace of the radar. Given that the budget of the downlink (aeroplane to radar) is good since ADS-B replies are being detected, if the aeroplane does not respond to all-call or roll-call interrogations this means that its transponder is still below the reception-end sensitivity threshold to the interrogations at 1030 MHz transmitted by the secondary radar. The additional roll-call interrogations intended for the transponder do not cause pollution since it does not sense them until it crosses above the reception-end sensitivity threshold.

The solution made possible by the invention is advantageous to ATC safety because the latter requires any failure of surveillance systems to be detected as soon as possible, during the flight of an aeroplane.

Detection of unsatisfactory altimeters.

The separation with respect to altitude of aircraft is one of the basic elements of aerial safety, both as regards air-traffic control and as regards automatic systems such as on-board collision-avoidance systems. Measurement of atmospheric pressure defines the local altitude of an aircraft, and therefore makes it possible to ensure a separation with respect to barometric altitude between aeroplanes in the same airway. It is known that failure of altimeters may cause aerial catastrophes. It is therefore important to detect, as soon as possible, or even in real-time, failure of a barometric altimeter, as the present invention allows before or as soon as an aeroplane enters into the aerial coverage of a secondary radar.

A first step, with a view to detecting unsatisfactory barometric altimeters, consists in establishing, per 3D geographic cell, an average atmospheric pressure, allowing a map of differences between barometric altitude and geometric altitude to be generated, the long-range ADS-B coverage of the invention having been divided beforehand into geographic cells. The size of a cell may typically be 1° of latitude and 1° of longitude.

Figure 12:
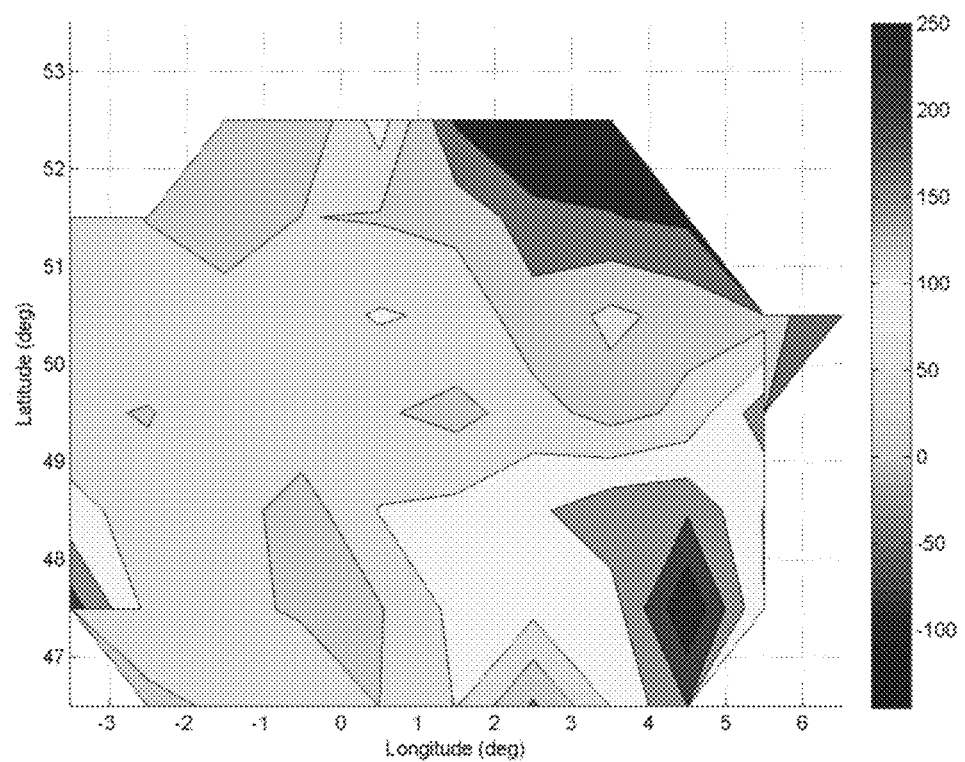
FIG. 12, an example of a map of averages in differences between barometric altitude and geometric altitude.

Information obtained from airborne velocity messages, which are a second type of ADS-B message, and which are transmitted every 0.5 seconds, delivers the altitude difference between the barometric measurement and the geometric measurement (which is obtained via GNSS satellite positioning in particular). According to the invention, statistics are collected on this difference, per geographic cell, in a moving time base that may be adjustable in order to take into account the atmospheric stability of the environment. FIG. 12 illustrates an example of a map of averages of the differences between barometric altitudes and geometric altitudes that is thus obtained. The gradation of the averages corresponds to the gradation of the greyscale level over the map.

In association with these averages per cell, the following are also considered:
the number of measurements in the cell that allow the average to be established;
a standard deviation of the measurements in each cell, reflecting the measurement stability in the cell and therefore the stability of the atmospheric pressure in this cell.

Figure 13:
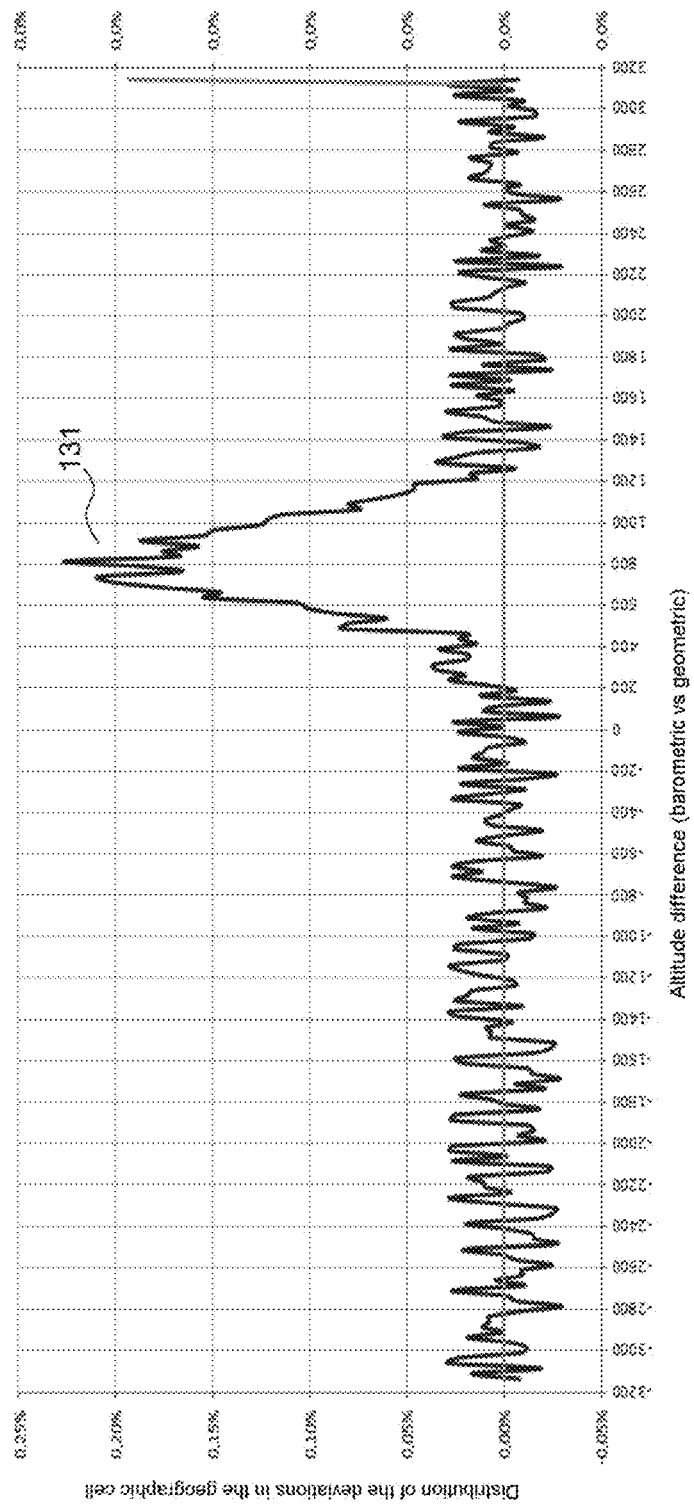
FIG. 13, the shape of an exemplary distribution of altitude deviation in a 3D geographic cell.

According to the invention, at the rate of the moving time base (moving time base in which the averages of difference per 3D geographic cell are taken):
for each geographic cell, an analysis is carried out of the distribution of the differences between barometric altitude and geometric altitude over the range of possible values delivered in the ADS-B squitter, typically with a pitch of 25 feet as illustrated in FIG. 13 which shows an example of a distribution 131 of these differences for all of the targets present in the geographic cell;
Then if:
on the one hand, the standard deviation of the differences is lower than a parameter of the invention indicating a stability of the differences in altitude in this cell; and
on the other hand, a number of differences in the cell is higher than another parameter, indicating a representativity of the average of the cell;
then any target of the radar present in the cell has its (barometric/geometric) altitude difference evaluated with respect to the average of the altitude differences.

The two parameters of the invention allow the operator to adjust the invention to the characteristics of his radar site:
atmospheric stability via the standard deviation
aeroplane congestion via the number of measurements.

Figure 14:
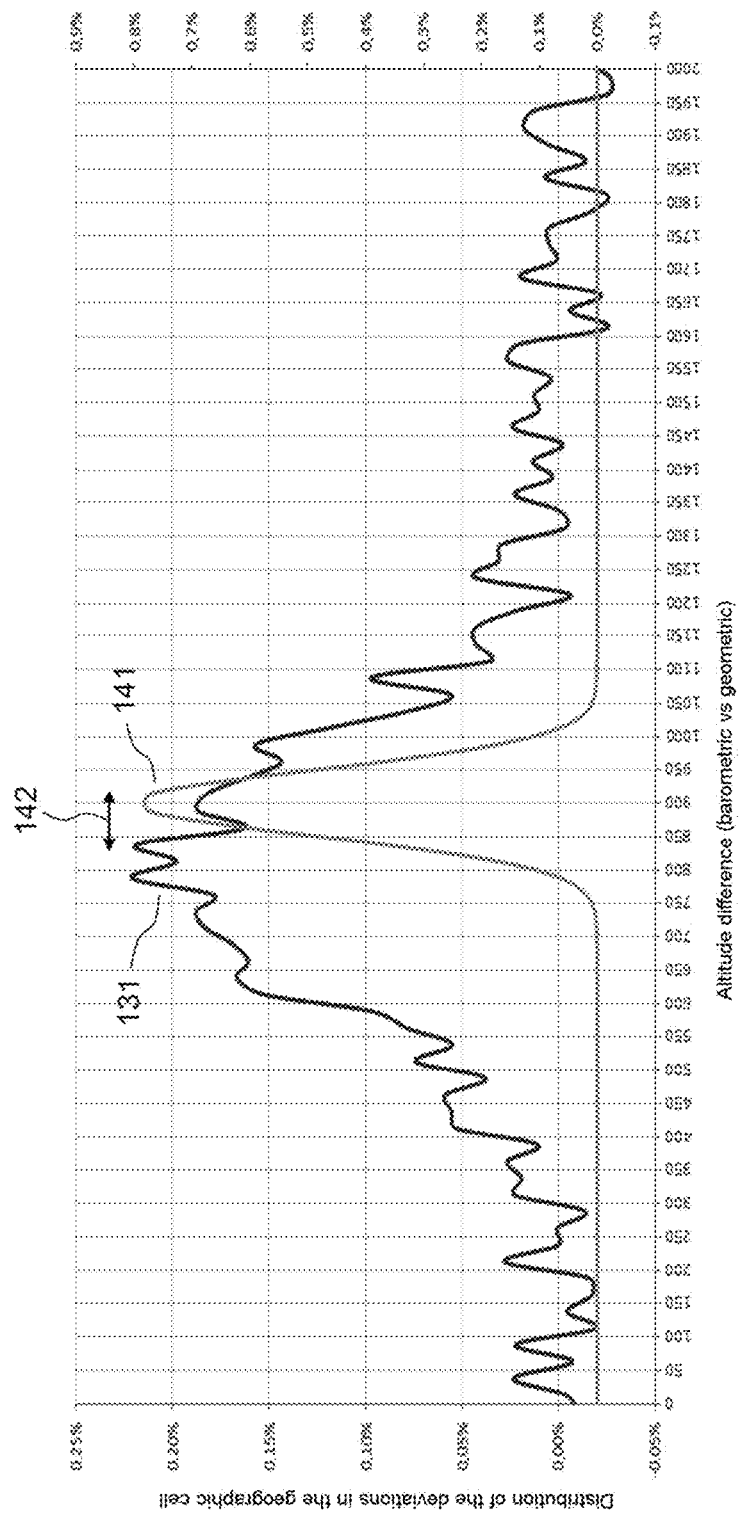
FIG. 14, a zoom in on a target altitude deviation that is consistent with targets in the same geographic cell.

If this altitude difference is close to the distribution of the other differences of the cell, according to a given proximity criterion 142, the target is considered to have a consistent barometric/geometric altitude difference and its ADS-B track score is increased in value, this case being illustrated in FIG. 14. This figure shows the difference of the target via a curve 141 that is close to the distribution of all of the differences 131.

Figure 15:
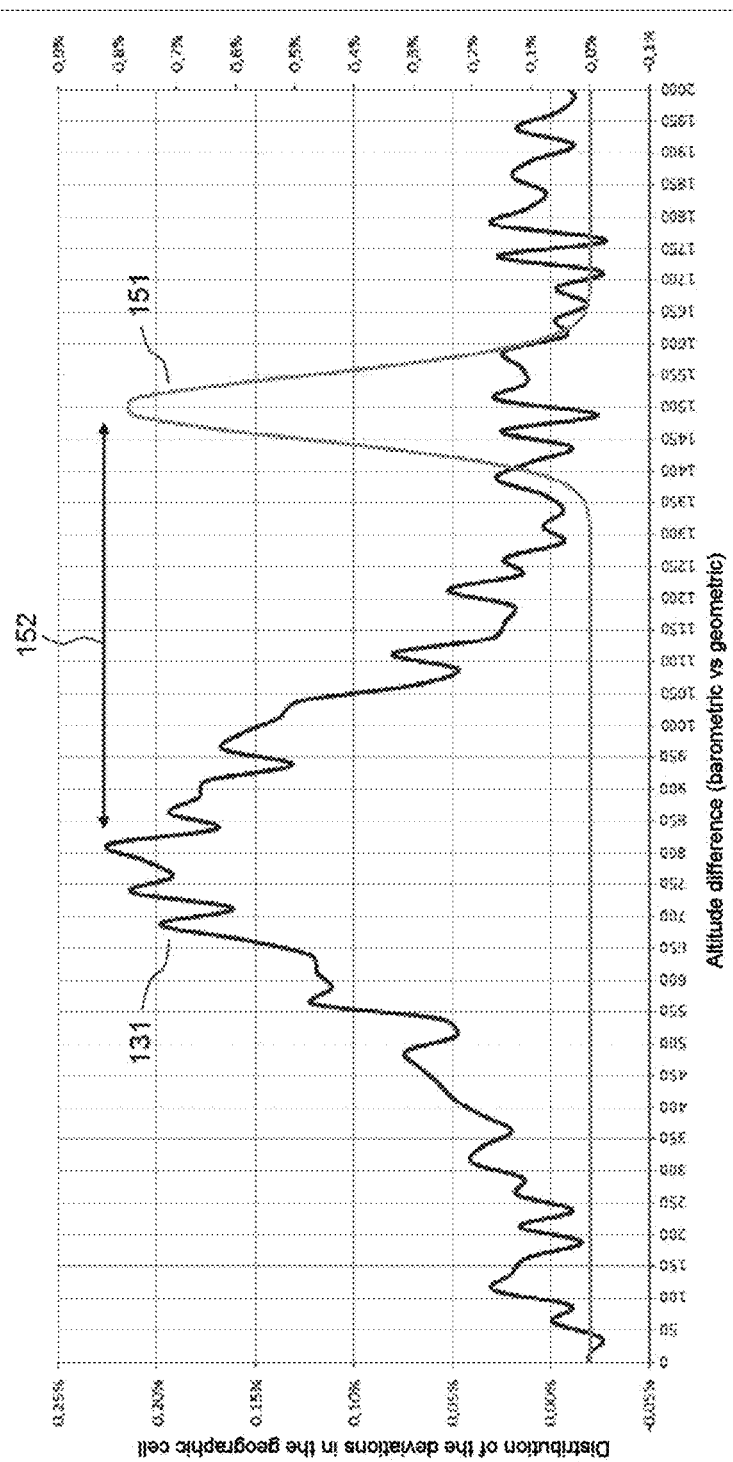
FIG. 15, a zoom in on a target exhibiting an altitude deviation that is inconsistent with targets in the same geographic cell.

If this difference 151 lies beyond the distribution of the other differences of the cell by an amount 152 that is too large, as illustrated in FIG. 15, the target is considered to have an inconsistent barometric/geometric altitude difference and its ADS-B track score is decreased in value, by attributing it the value −1 instead of the value +1 as in the preceding case (FIG. 14).

The consistency score of the barometric/geometric altitude difference of each ADS-B track is analysed on the basis of a given number of comparisons that are performed with a view to declaring, to a user of the radar, whether this score is below a presumed value of an unsatisfactory altimeter. This value is defined bearing in mind the precision of the ADS-B position measurement transmitted in the squitters, which were used to establish the barometric/geometric altitude difference both for the reference of the cell and for the target in question. Thus, the more precise the altimetry error detection, the more it decreases the population of targets used, and therefore concerned by the test, and the more the invention must integrate this smaller quantity of data per cell in a longer moving window. This parameter allows the usual compromise between measurement position and stationarity of the context of the measurement to be adjusted.

The very-long-range detection of ADS-B squitters allows this statistical analysis to be carried out before the target enters into the coverage of responsibility of the Mode S radar and thus allows an air traffic controller to manage the separation between such a target and those surrounding it with a larger margin in order to ensure ATC safety, even in the case of altimeter malfunction.

The invention claimed is:

1. A method for locating, with a secondary radar comprising an antenna having a radiation pattern forming a sum channel, designated SUM, a radiation pattern forming a difference channel, designated DIFF, and a pattern forming a control channel, designated CONT, targets transmitting ADS-B squitters, the secondary radar having a predefined interrogation coverage, wherein said targets are located by implementing the following steps:
detecting ADS-B squitters received via said CONT channel, via said SUM channel and via said DIFF channel;
measuring at least the power of said squitters and their azimuth with respect to said radar;
the location of a target transmitting ADS-B squitters being computed by exploiting at least the detection of a single ADS-B squitter, in light of the latitudinal and longitudinal position of said radar and of the azimuthal measurement with respect to said radar, a position cell, designated the CPR cell, coded in said squitter being selected via said azimuthal measurement.

2. The method according to claim 1, wherein, in the case where two CPR positions coded in said squitter are possibly positioned in the same azimuthal sector, said two positions are discriminated between using the measured power and the altitude that is coded in said ADS-B squitter, the retained position being the position of highest likelihood according to an estimator based on the visibility of said target and to the consistency of the power received by the radar with the distance from the target to the radar.

3. The method according to either claim 1, comprising a step wherein the roll-call acquisition of a target is ensured as soon as it enters into the interrogation coverage of said radar by exploiting:
the position coded in the ADS-B squitters transmitted by said target, as soon as it enters into a reception coverage of said radar;

the roll-call identity of said target, which is contained in its Mode S address, which is coded in said squitters, a single roll-call interrogation being transmitted every N rotations of the antenna in order to lock the target to the code of the radar station and thus to avoid pollution by the DF11 replies that a target usually generates on each rotation, potentially as soon as it enters into said interrogation coverage and up to a region of operational range of said radar.

4. The method according to claim 1, comprising a step wherein, said targets being detected and located via their ADS-B squitters before the interrogation coverage of said radar, said targets are associated with ADS-B tracks as soon as they enter into said interrogation coverage, allowing them to be acquired by said secondary radar, then said tracks are momentarily unlocked on their entry into said operational radar coverage in order to allow a potentially locked state thereof, i.e. whether they are locked to another radar, i.e. the absence of synchronous DF11 replies, to be detected and thus potentially to make it possible to provide warning of a conflict in II/SI code to other Mode S targets without ADS-B capability while ensuring Mode S roll-call surveillance of a target as soon as it enters into the operational coverage of said radar.

5. The method according to claim 1, comprising a step wherein, in one moving time window, per geographic cell flown over by a target, an average of the difference between the distance of the target measured by said radar and the distance of said target coded in the ADS-B squitters transmitted by said target is computed, this being done for every target passing through the cell, then each distance measured by the radar of any target in any mode is then corrected in light of the average differences computed for the geographic cell being flown over by said target.

6. The method according to claim 1, comprising a step of measuring the sensitivity of transponders then detecting transponders of unsatisfactory sensitivity to the interrogations at 1030 MHz transmitted by said radar by interrogating, in roll-call mode or not, the targets transmitting ADS-B squitters located via said method, on entry into the interrogation coverage of said radar, and by computing the sensitivity of the transponder on the basis of the power received by the transponder on its first reply to said interrogations at 1030 MHz, a transponder being declared to be of unsatisfactory sensitivity if said power is higher than a given threshold.

7. The method according to claim 1, comprising a step wherein an unsatisfactory altimeter associated with the transponder of an ADS-B target is detected by exploiting, in a series of geographic cells flown over by said target, the deviation of the difference between the barometric and geometric altitude coded in the ADS-B squitters transmitted by said target from the average, in a moving time window, of the difference between the barometric altitude and geometric altitude computed for other targets per cell for each of said geographic cells flown over by said target, an altimeter being judged to be unsatisfactory if said deviation exceeds a given threshold.

8. A secondary radar, configured to implement the method according to claim 1.

* * * * *